United States Patent [19]
Holland et al.

[11] Patent Number: 5,468,575
[45] Date of Patent: Nov. 21, 1995

[54] MAINTENANCE-FREE HIGH CAPACITY LEAD BATTERY OR ACCUMULATOR

[75] Inventors: Gunther K. Holland, Budingen-Düdelsheim; Wolfgang Kügler, Ortenberg, both of Germany

[73] Assignee: Accumulatorenfabrik Sonnenschein GmbH, Budingen, Germany

[21] Appl. No.: 169,429

[22] Filed: Dec. 17, 1993

[30] Foreign Application Priority Data

Dec. 17, 1992 [DE] Germany .................. 42 42 661.8

[51] Int. Cl.⁶ .................... H01M 2/12; H01M 10/52
[52] U.S. Cl. .................... 429/56; 429/57; 429/72; 429/204
[58] Field of Search .................... 429/57, 72, 56, 429/204

[56] References Cited

U.S. PATENT DOCUMENTS 3,518,125  6/1970  Fischbach .................... 429/56
4,169,918  10/1979  Moore .................... 429/57
5,173,374  12/1992  Tiedemann et al. .................... 429/57 X Primary Examiner—John S. Maples
Attorney, Agent, or Firm—Shlesinger Fitzsimmons Shlesinger

[57] ABSTRACT

The invention refers to a gas-tight, maintenance-free high capacity lead accumulator with a sulphuric acid thixotrope (13) as electrolyte. To ensure operatability of the accumulator in upright as well as in horizontal position, the liquid electrolyte released under certain charging conditions has to be collected. For this purpose layers of fibrous web (10, 22) of highly porous and absorbing material are at least partially provided at the edges of the accumulator and above the plate group (1) which temporarily store liquid electrolyte and again release it.

9 Claims, 4 Drawing Sheets

Schnitt II - II

Schnitt IV-IV

MAINTENANCE-FREE HIGH CAPACITY LEAD BATTERY OR ACCUMULATOR

BACKGROUND OF THE INVENTION

The invention refers to a gas-tight, maintenance-free high capacity lead battery or accumulator according to the characterizing clause of claim 1.

A gas-tight seal and maintenance-free operation are rendered possible by the use of an electrolyte containing sulfuric acid in the form of a thixotrope where an evaporation of fluid or a gassing is essentially excluded. High capacity accumulators equipped in such way shall be those in which because of the bigger or higher construction as a function of the charging status such quantities of free non-solid or gaseous electrolyte evade from the gel or the active mass or the separators respectively that they can no longer be disregarded. A greater problem is especially the assembly of such an accumulator in a horizontal position which, because of the easier positioning, charging and operation and a space-saving stowage, is the preferred position for larger arrangements with a variety of accumulators positioned side-by-side or on top of each other in one rack. In such case the free sulfuric acid can reach the pressure control valve which is always present for safety reasons, and thus can escape to the outside.

During a discharge the volume of the electrolyte decreases and the volume of the active masses of the electrode plates increases, during charging this is the other way round. In this case gas additionally emerges in the pores of the electrode plates which displaces the electrolyte present there. The electrolyte volume is partially reversibly absorbed by the gel structure. As a result a quantity of liquid electrolyte which cannot be ignored occurs above the plate group.

For this reason the German application DE 37 27 763 C1, which corresponds to U.S. Pat. No. 4,894,300, provides a partition for a horizontal arrangement of the accumulator which closes the space between electrode plates and cover in a lower section, which also covers the charging hole. The space is preferably filled with a sealing cellular material which is injected. The term lower section here refers to the horizontal arrangement. The free sulfuric acid electrolyte can then only occur in the remaining upper free space between electrode plates and case cover. The pressure control valve which is required nevertheless is positioned at a side wall of the accumulator in such way that in horizontal position it faces upwards.

The arrangement described there has the disadvantage that such an accumulator can only be operated in the horizontal position, that even in such a specific horizontal position in which the pressure control valve is positioned in the upper sidewall has to be chosen, that the free space still available adjacent the control valve is relatively small so that there can be frequent excess pressure reactions, i.e. discharging via the pressure control valve, which might impair availability. A combination of such a horizontal battery with another vertical battery in one common rack is complicated, time-consuming and requires more space. If only one horizontal position is possible where, for example, all positive terminals are positioned above the negative terminals, a longer diagonal connection with the negative terminals of the adjacent battery is required. It is further undesirable to provide two different battery types for a horizontal arrangement with higher expenses for manufacture, storage and distribution where in a first type the negative terminals and in a second type the positive terminals is positioned uppermost when the accumulator is in horizontal position.

DE 40 32 990 A1 suggests to lead the gas outlet from one side below the cover to the centrally fitted valve so that the electrolyte in the horizontal position of the accumulator can rise via the centre of the cell. The accumulators can only be displaced to a specific side which is disadvantageous and can lead to installation errors.

JP- OS 87-157673 describes a lead accumulator using a separator with glass fiber as its main component. This separator has average openings of between 30 and 50 μm. The quantity of the water and the pressure are related to the average diameter of the openings. The absorbing power for fluids in the negative electrode plate shall thus become higher than for the separator. The distribution of electrolyte in the accumulator shall thus become more even, the storage capacity shall thus be improved and the drop in capacity be suppressed. This arrangement is only suitable for influencing small plate areas. The issue of a horizontal arrangement of large-scale batteries of between about 200 and 1200 ampere-hours is not discussed in this reference.

Besides zigzag-shaped electrode grids JP OS 87 115658 suggests thick separators of hydrophilic synthetic material or glass fiber with an average thickness of 1 μm or more for the largest proportion of the separator sections, whereas correspondingly thinner glass fibers are provided in the remaining section. Additionally, electrolyte holding devices, for example of hydrophilic porous synthetic material, are suggested which contain fine silicium powder having a greater aptitude to hold electrolyte than a separator. By these measures the use of very expensive separators shall be avoided despite the even distribution of electrolyte. JP- OS 87-115659 too suggests the combination of thick separators of hydrophilic synthetic material or glass fibers with thinner separators for other groups of electrode plates, it further suggests an additional electrolyte holding body of hydrophilic, porous synthetic material with fine silicium powder and a higher holding capacity compared to the separator. Here too the problematic nature of accumulators in horizontal position is not discussed.

The invention is based on the problem of designing a gas-tight, maintenance-free high capacity lead accumulator according to the characterizing clause of claim 1 in such way that the accumulator can be operated in a horizontal as well as in an upright position avoiding two different accumulator versions where the positive or the negative terminal can be positioned one above the other.

This problem is solved in accordance with the invention by the characterizing features of claim 1. Further embodiments of the invention are protected by the subclaims.

In the free spaces of the accumulator the invention provides layers of fibrous web which absorb free, especially liquid electrolyte under specific charging conditions and which again release it to the gelous electrolyte or the active masses of the electrode plates respectively under different charging conditions.

Elastic, highly porous material, preferably with a porosity of between 90 and 99% is used as fibrous web. To adapt this fibrous web to the requirements of the accumulator, this fibrous web is preferably pressed together to a certain extent.

The fibrous material is suitably positioned at the lateral edges, at the bottom and above the edges or above the terminal bars of the electrode plates. Besides glass fiber, polyester and polyethylene can in particular be used as material.

In practice the following areas of a maintenance-free accumulator are responsible for the binding of electrolyte:

a) The pores in the positive and negative electrode plates, from which the cyclic formation and binding of the electrolyte originates.

b) A fine pored gel structure between electrode plates and separators. It holds the electrolyte very tight. Apart from that electrolyte can flow into further pore systems through existing cracks within the gel structure. These cracks also transport the gas bubbles.

c) The pores of the separator; the gel particles can hardly penetrate into these pores, the electrolyte is thereby very tightly held in the pores of the separator.

d) The pores of the fibrous web provided according to the invention are mostly filled to a large extent between the lateral edges and the side wall as well as possibly at the bottom of the case.

e) Excess electrolytic fluid present flows into the pores of the fibrous web slightly pressed together which is positioned above the electrode plates. These mainly absorb the changing free electrolytic volume of the accumulator. Here the lower sections are filled first depending on whether the battery is arranged in vertical or horizontal position. In accordance with the ability to rise within the capillaries of the fibrous web the upper sections of the fibrous web are then eventually filled too so that there remains hardly any free electrolytic fluid in the free space near the pressure control valve.

BRIEF DESCRIPTION OF THE DRAWINGS

Embodiments of the invention are illustrated in the drawings.

In the drawing identical reference numbers are assigned to identical parts. In FIG. 1 the accumulator case is referred to as 9, the case cover as 11, the charging or filling hole, on which the pressure control valve 12 rests, as 21. The positive electrode plates are referred to as 2, the negative electrode plates above are referred to as 3, the separators positioned in between are referred to as 4, the whole plate group is referred to as 1. The individual positive electrode plates 2 are connected to a positive terminal 5 led through the case cover 11 to the outside via positive connecting strap 7. In the same way the individual negative electrode plates 3 are connected to the terminal 6 led outside via negative connecting strap 8. Electrolyte containing sulfuric acid in the form of thixotrope is referred to as 13. The electrolyte is filled beyond the connecting strap 7, 8 followed by a relatively wide free space, also referred to as gas space, and case cover 11.

Figure 1:
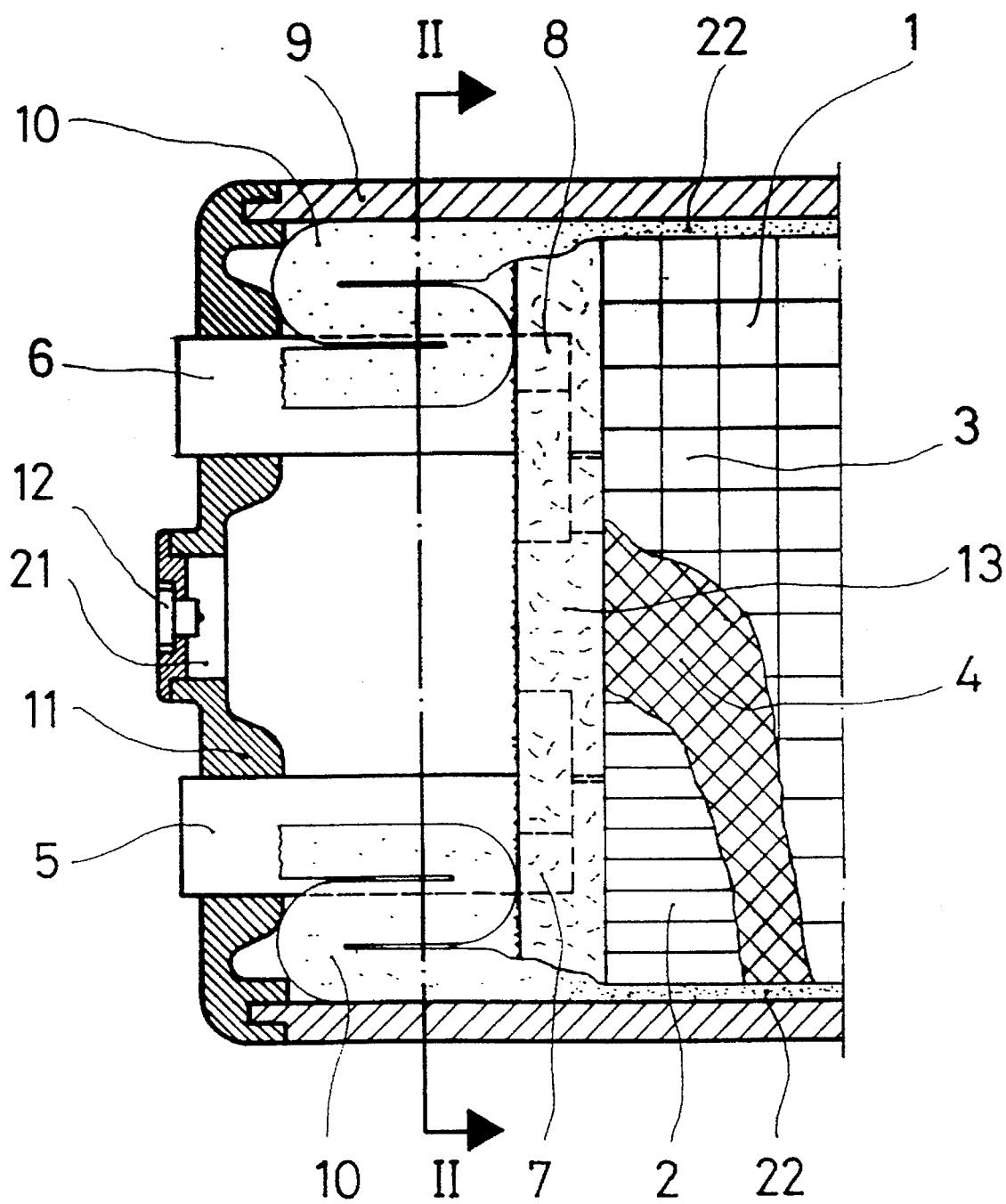
FIG. 1 shows the longitudinal section of an accumulator or battery lying on its side in a horizontal position with the cover of the battery facing laterally or toward the left in this FIG., and with layers of the fibrous web positioned below cover 11.

In the example of FIG. 1 separators 4, positive electrode plates 2 and negative electrode plates 3 are arranged in an upright position one behind the other which is illustrated schematically by corresponding partial sections.

According to the invention a relatively narrow layer of fibrous web 22 is provided at the narrow free spaces in FIG. 1 formed between the inside surface of case 9 and the opposed edges of the electrode plates and the separators respectively as well as possibly at the bottom (not illustrated) of the battery. The fibrous web becomes wider above or to the left of the electrode plates as shown in FIG. 1 and stretches forming upper and lower sections 10 between the electrolyte and the case cover 11 where it is folded twice to the respective terminals 5, 6. The separators 7 are preferably composed of a microporous polyvinylchloride with spacing ribs on both sides. At the lateral edges of the separators and the electrode plates the fibrous web 22 is pressed together to 50% to 80% while the fibrous web section 10 above the electrode plates is only slightly pressed against the respective terminals 5, 6.

Then case cover 11 is placed, is connected to case 9 in a sealing way and the terminals 5, 6 are also sealed. Then thixotropic electrolyte 13, as, for example, also known from DE-PS 11 94 015, is filled up to the level of the connecting straps 7, 8. After that the charging hole 21 for the electrolyte is closed by an appropriate pressure control valve 12 which at a certain pressure opens to the outside.

Figure 2:
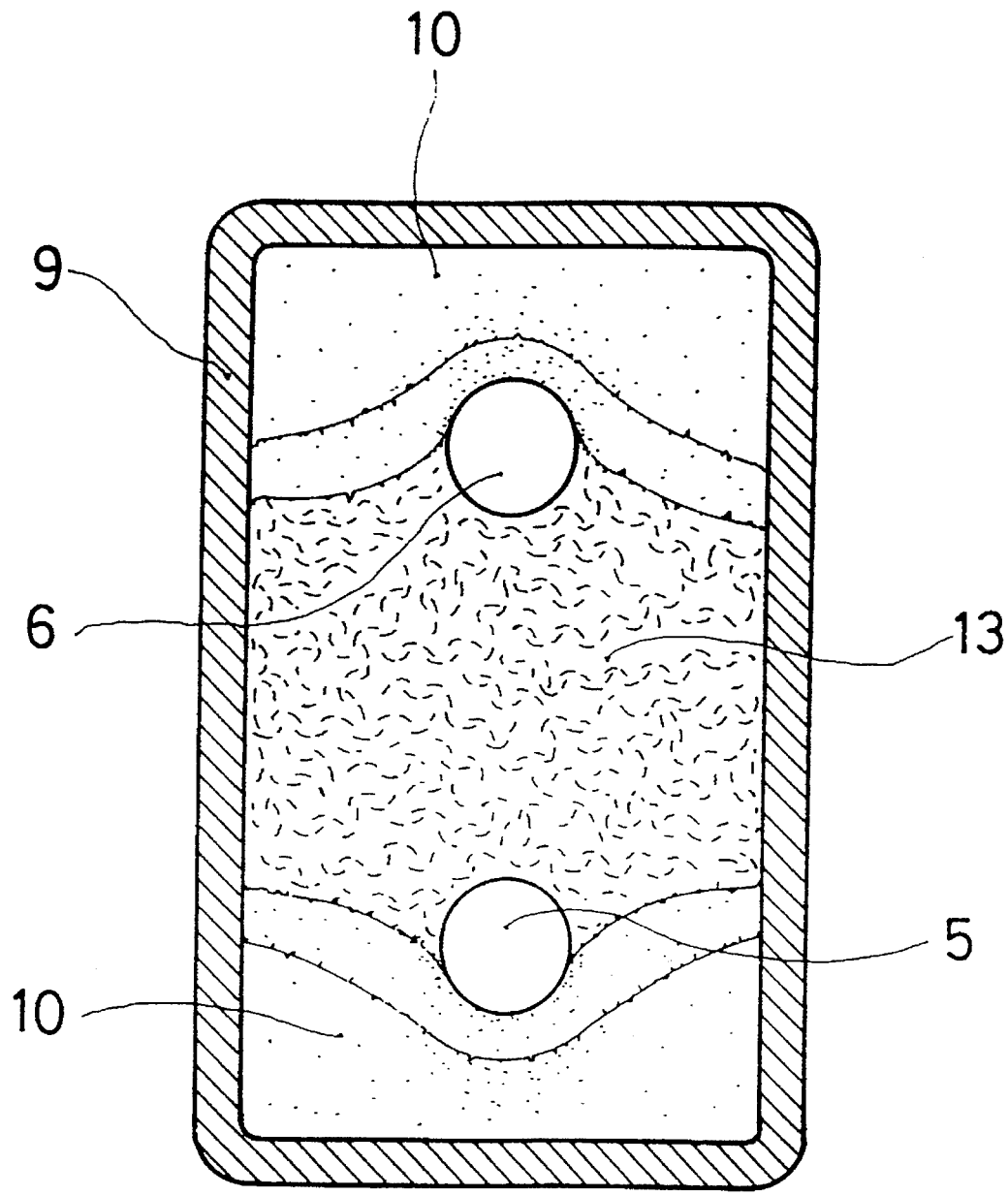
FIG. 2 shows a cross section of the accumulator shown in FIG. 1 from the front.

FIG. 2 shows a cross section through the accumulator shown in FIG. 1 along the line II—II of FIG. 1. Identical reference numbers have been assigned to identical parts.

Figure 3:
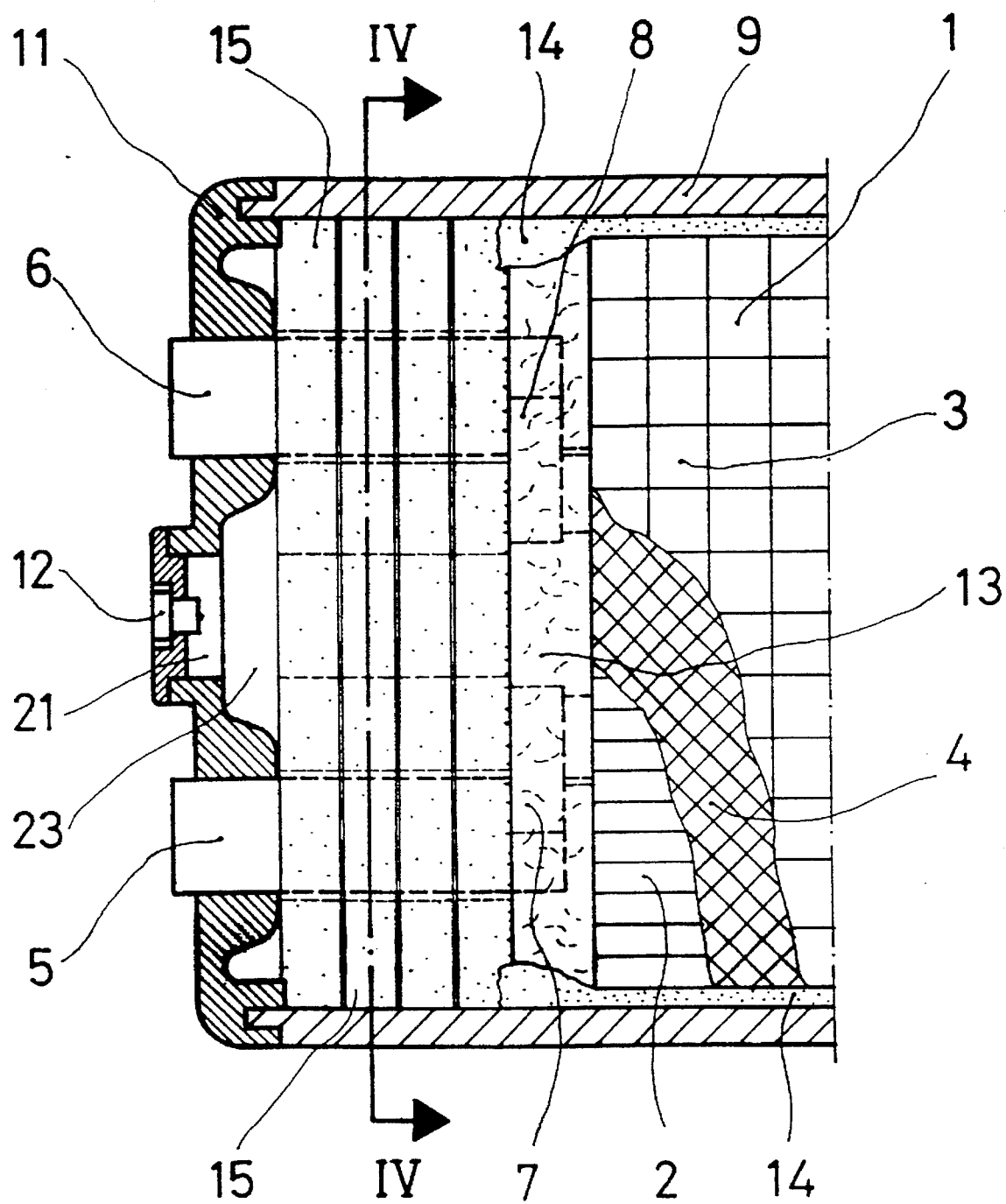
FIG. 3 shows a further embodiment of an accumulator in horizontal position with several layers of fibrous web positioned in the free space between the connecting strap and the case cover in a longitudinal section.

FIG. 3 shows another embodiment of an accumulator also in horizontal position. The only difference to the example described before is that the layer of fibrous web 14 at the two opposing lateral edge sections of the plate group ends somewhat above the connecting straps 7, 8 or above the surface of the solidified thixotrope. The whole larger free space between the gel or the connecting straps 7, 8 respectively and the case cover 11 is essentially covered by one or preferably several layers of fibrous web 15 which can temporarily absorb very high quantities of excess liquid electrolyte. As for the rest, the entire plate group is referred to as 1. Apart from exit holes for the two terminals 5, 6, the individual layers of fibrous web also have a further opening 23 extending to the gel surface in the range of the charging hole 21 on which the pressure control valve is placed in a sealing way. Depending on the operating conditions, this opening can taper or widen conically towards the gel surface. For this type it is possible to use a different, possibly better suitable material for covering the lateral edges. Besides, an appropriate porous fibrous web can also advantageously be inserted between the bottom and the edges of the bottom of the plate group to create a facility for absorbing excess liquid electrolyte.

If, for example, an average pore diameter of 0.1 mm is chosen for the fibrous web in the no load condition, the electrolyte because of the capillary effect can rise to about 200 mm, if the fibrous web is completely wetted. This approximately corresponds to the necessary capillary rise for a cell in horizontal position. If the fibrous web is pressed together to a fifth of its thickness or its volume respectively, the capillary rise is greater accordingly. Surprisingly synthetic fibrous webs of polyester and polyethylene proved to be suitable too, although these are known to be materials which are very difficult to be wetted. By a special pretreatment, which leads to a gloss effect of these fibers and which is known as reviving, a sufficient initial wettability is achieved surprisingly. By the corrosion of the sulfuric acid as well as the electrochemical oxidation effect during charging, the wettability of the surface of the fibers slowly improves without having a significant negative impact on the resistance of the fibers.

Figure 4:
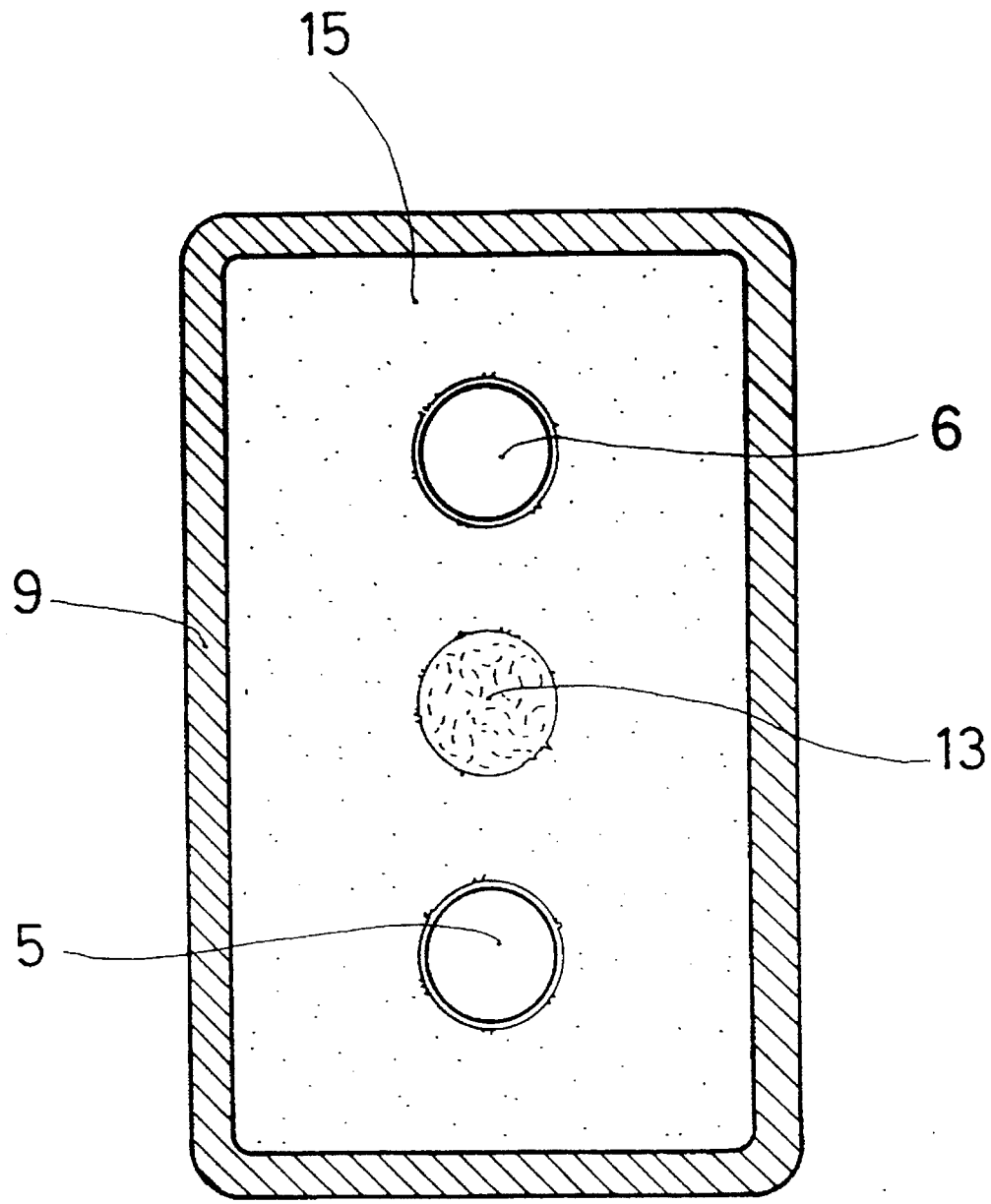
FIG. 4 shows the embodiment shown in FIG. 3 as a cross section from the front.

FIG. 4 shows a cross-section of the accumulator shown in FIG. 3 along the line IV—IV. Identical reference numbers are assigned to identical parts.

We claim:

1. Gas-tight, maintenance free high capacity lead accumulator having a case (9) closed at one end by a cover (11) and containing a plate group (1) including positive (2) and negative electrode plates (3) separated by separators (4) and with a first free space formed between the plate group (1) and the case cover (11), and with a second free space smaller than said first free space formed between the opposed edges of the electrode plates and the opposed side walls of said case (9), and with a charging hole (21) and a pressure control valve (12) mounted in said cover (11), said positive (2) and negative electrode plates (3) respectively being connected via connecting straps (7,8), respectively, to positive (5) and negative poles (6) that are mounted in the case cover (11) in a sealed way, and a thixotrope in which sulfuric acid is bound being filled in as an electrolyte around the connecting straps (7,8) and collecting devices being provided in said case (9) for absorbing free liquid and gaseous electrolyte produced in said case (9) when the case is placed on its side or in the horizontal position of the accumulator, characterized in that said first and second free spaces have mounted therein highly porous fibrous webs (10,22,15,14) of a material selected from the group consisting of glass, mineral or synthetic fibers at least portions of which are arranged as said collecting devices, whereby the liquid and gaseous electrolyte as a function of the charging state of the accumulator can be stored in said devices and can again be released under changed charging conditions without releasing the pressure control valve (12) at correspondingly increased internal pressure.

2. Accumulator according to claim 1, characterized in that the fibrous web (22, 14) positioned in the second free space extends at least partially into the first free space beyond the thixotrope (13) and connecting straps (7, 8).

3. Accumulator according to claim 1 or 2, characterized in that the second free space is occupied by two opposing layers of fibrous web (22) portions (10) of which extend into said first space and up to the case cover (11) and which last-named portions (10) are folded.

4. Accumulator according to claim 1 or 2 characterized in that the larger free space is occupied by one or more correspondingly thin layers of fibrous web (15) having therethrough a central opening registering with the pressure control valve (12).

5. Accumulator according to claim 1 or 2, characterized by said webs having a porosity of 90 to 99%.

6. Accumulator according to claim 1 or 2, characterized in that the fibrous webs attain a defined initial wettability through a treatment referred to as reviving.

7. Accumulator according to one of the claims 1 or 2 characterized in that each of said fibrous webs is elastic and in its installed state is pressed together to a reduced thickness in a range of between 10% and 90%, and for the webs in said second space to a range of 50 to 80% of the non-pressed thickness.

8. Accumulator according to claim 1 or 2 characterized by at least one of said webs comprising a composition of a matted laminate of synthetic fiber, which is coated by a coating layer of a synthetic material having a low melting point, adjacent fibers of the matted laminate being melted into one another point by point through heating during manufacture.

9. Accumulator according to claim 8, characterized in that polyester is used as a core synthetic material of the fibers of the matted laminate.

* * * * *